G. ESTERLY.
Broadcast Seeder.
No. 79,332.
Patented June 30, 1868.
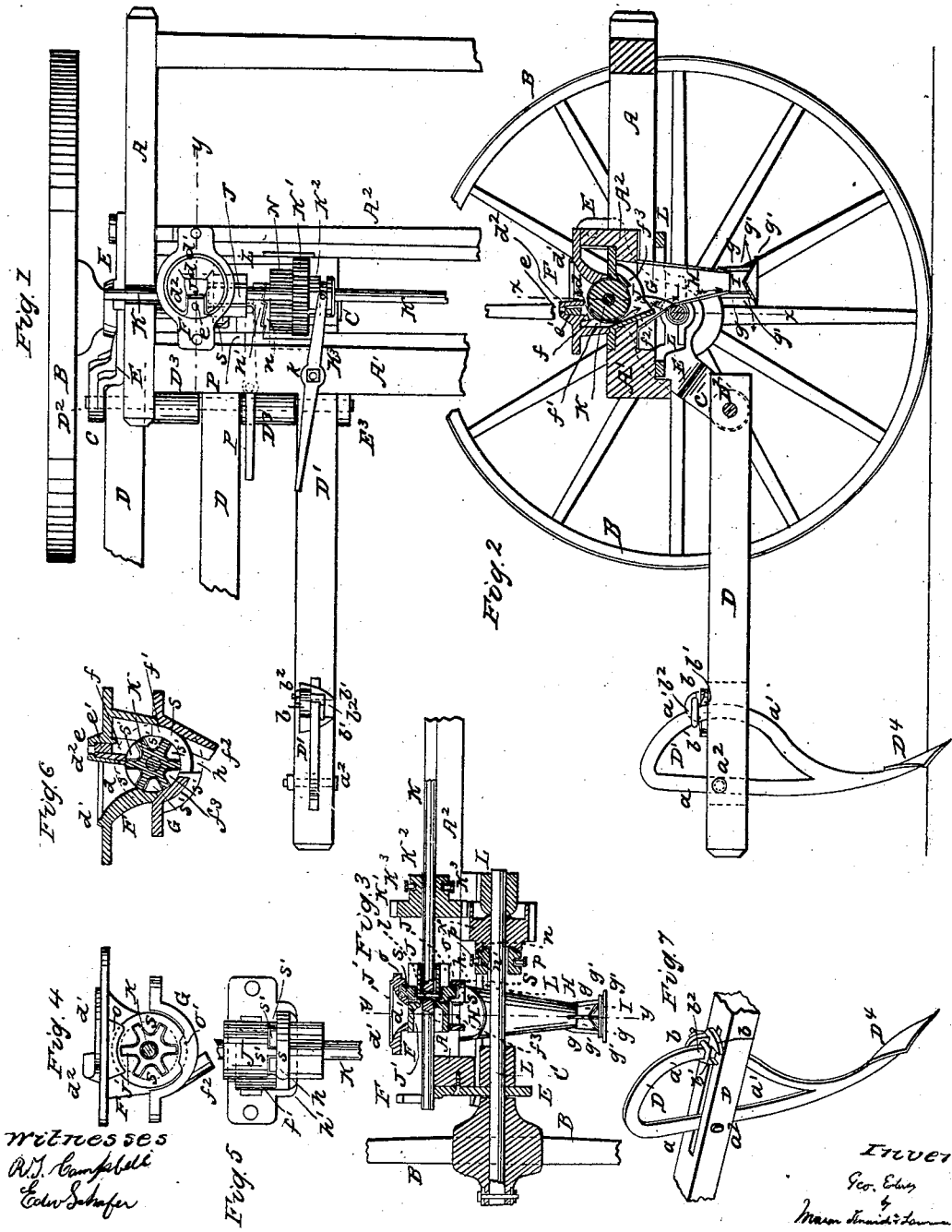

United States Patent Office.

GEORGE ESTERLY, OF WHITEWATER, WISCONSIN.

Letters Patent No. 79,332, dated June 30, 1868.

IMPROVEMENT IN BROADCAST SEEDER AND CULTIVATOR.

*The Schedule referred to in these Letters Patent and making part of the same.*

TO ALL WHOM IT MAY CONCERN:

Be it known that I, GEORGE ESTERLY, of Whitewater, in the county of Walworth, and State of Wisconsin, have invented a new and improved Broadcast Seeder and Cultivator; and I do hereby declare that the following is a full, clear, and exact description thereof, reference being had to the accompanying drawing, making a part of this specification, in which—

Figure 1 is a top view in detail of one side of the improved machine, showing the bottom of the seed-cup closed by the cylinder of the discharging-device.

Figure 2 is a longitudinal section taken in the vertical plane indicated by red line $y$ in fig. 1.

Figure 3 is a vertical section taken through the machine, as indicated by the course of red line $x\,x$ in fig. 2.

Figures 4, 5, and 6 represent the construction of the seed-cup and discharging-device.

Figure 7 is a perspective view of one of the hoes and its fastening.

Similar letters of reference indicate corresponding parts in the several figures.

This invention relates to certain novel improvements on seeding-machines and cultivators combined, wherein the working parts are mounted upon driving and transporting-wheels, and adapted for broadcast sowing and covering.

The nature of my invention consists in constructing the seed-distributing cup of two horizontal sections adapted for receiving between them a rotary and laterally-adjustable distributer and cut-off, and also a chamber for receiving a packing of India rubber, or other equivalent substance, which will allow the distributer and cut-off to be fitted snugly in place, and which will prevent the seed from being crushed or otherwise injured in their passage from the hopper to the seed-tubes, as will be hereinafter described.

It also consists in constructing the upper section of the seed-distributing cup with an upwardly-flaring throat of such depth as will effectually prevent it from being clogged with short straws and other foreign substances mixed with the seed; also, in providing a free discharging-channel or passage leading from the throat of the distributing-cup around one side of and beneath the distributer to the seed-tube, and in having a circular bearing and apron on the opposite side of the distributer for the latter to fit snugly against, as will be hereinafter described.

Also, in providing an exit for seed through the lower section or bearing of the seed-cup, and through the bottom of a recess, into which is fitted a circular flange, through which the toothed or chambered portion of the distributer slides to adjust the feed for the purpose of allowing any scattering kernels which might get into said recess to freely escape therefrom into the seed-tube without being crushed, as will be hereinafter described.

It further consists in applying the rotary cylindrical cut-off and distributer upon its shaft in such manner that this distributer may adjust itself to any inequalities in the parts, and thereby not be liable to bind and work hard if fitted to work properly within its seed-cup and bearing, as will be hereinafter described.

It further consists in a rotating and endwise-adjustable distributer having a plane-faced cylindrical cut-off formed upon one end of it, in combination with a circular flange having lateral segmental projections formed on it, and fitting into the seed-cells in the distributing portion, said parts being so constructed and fitted within the seed-cup and its bearing that by giving the shaft of the distributer an endwise movement, whether it be rotating or not, the discharge of the seed can be regulated or entirely cut off at pleasure, as will be hereinafter described.

It further consists in providing for regulating the discharge of seed from the seed-cup by means of an endwise adjustment of a rotary-toothed distributer without disengaging the pinion-spur wheel on the shaft of this distributer from the driving-spur, which is on the main axle of the transporting-wheels; and, in conjunction with this feature, the invention also consists in providing for stopping and starting the distributer at pleasure while the machine is being moved forward by means of a sliding-clutch applied to the axle of the transporting-wheels and the spurred wheel thereon, as will be hereinafter described.

It further consists in providing each one of the seed-tubes with a conical scatterer arranged beneath its lower end, which scatterer is constructed with annular ribs upon its surface for more effectually scattering the seed falling from said tubes, as will be hereinafter described.

It further consists in sustaining the extremities of the rod to which the drag-bars are all pivoted by means of lateral offsets, so applied to the side-bars of the draught-frame as to allow the two outside drag-bars to run very close to the wheels, and thereby enable me to shorten the distance between the wheels, and at the same time retain the proper distance between the hoes, which will have the effect, in a machine carrying a given number of hoes, of shortening the leverage of the wheels against the team, as will be hereinafter described.

It further consists in providing segmental-shaped hoe-standards, which are pivoted to the drag-bar with adjustable clamp-stops so constructed and applied to said standards on top of the drag-bars as to serve as a means for adjusting the standards and setting them to work at any required angle or pitch, and also to allow the standards to slip backward should the hoes strike any object which would be liable to break or derange the machine, as will be hereinafter described.

To enable others skilled in the art to understand my invention, I will describe its construction and operation.

In the accompanying drawings, I have represented only those parts of a complete working machine which are necessary to illustrate the construction and operation of my invention.

In a practical working machine I employ about twelve drag-bars and hoes and live seed-distributers. I also employ a lifting-bar for the drag-bar, with devices whereby the driver, sitting upon the machine, can raise or depress all the drag-bars simultaneously, and retain them at any desired height. I also employ a seed-hopper over the seed-distributers, upon which the driver having control of the machine can sit.

These several parts do not constitute any part of my improvement and invention, and may be constructed and applied in any suitable or well-known manner.

The draught-frame consists of longitudinal beams A and transverse beams $A^1 A^2$, secured together and braced in any suitable manner so as to form a strong frame for receiving and supporting the seed-distributing and covering-machinery.

I have represented only so much of this draught-frame as is necessary to illustrate one of the seed-distributers and the hoes belonging thereto.

B represents one of the transporting-wheels, which is keyed fast upon its axle, C, so as to turn this axle when the machine is moved along; and N represents a long spur-wheel, which is applied loosely upon the axle C, but engaged therewith by means of a clutch, consisting of the toothed hub $n$ and a correspondingly-toothed drum, $n^1$. This drum $n^1$ is applied upon its axle C, so as to turn therewith at all times by means of the key-tenon $n^2$, shown in fig. 3, and this drum is moved up to and from the hub $n$ of wheel N by means of a lever, P, one end of which embraces the drum, and has steel pins fitted into an annular groove made therein, as shown.

Lever P is pivoted to the bottom side of the rear beam A of the draught-frame, and extends out in rear thereof, as shown in fig. 1.

Beneath the draught-frame, and firmly bolted thereto, is a metal frame, L, which is constructed with bearing or journal-boxes for the axle C to turn in; and on each side, outside of the draught-frame, is a casting, E, which is bolted rigidly in place, and affords a pivotal attachment for a seed-hopper, (not shown in the drawings;) also, a flanged dirt-guard for the axle C, and also a rear bearing for supporting the rod $D^2$, to which the drag-bars are pivoted, as shown in figs. 1 and 2.

The rear extension $e$ is set outward from the main portion of its plate E, as shown in fig. 1, for the purpose of allowing the outer drag-bar D to be brought as near the side of the wheel B as possible without touching this wheel. Between these lateral offset bearings $e$ there may be interposed auxiliary bearings, as at $E^3$, for strengthening and stiffening the rod $D^2$.

The drag-bars D are pivoted at their front ends to this rod $D^2$, and properly spaced by means of cylindrical tubes or blocks, $D^3$, as shown in fig. 1. These drag-bars have free vertical motions, and carry hoes, $D^4$, near their rear ends, for stirring the soil and covering in the seed.

I will describe the manner of constructing and applying the hoes after I have described the devices invented by me for discharging the seed.

The teeth of the long spur-wheel N, above described, engage with the teeth of a pinion-wheel, $K^1$, which is keyed fast upon a shaft, K, that extends transversely across the draught-frame, and has its bearings upon the upper side thereof, as shown in figs. 1 and 3.

On one side of the wheel $K^1$ is an annularly-grooved hub, $K^2$, in the grooves of which studs are fitted loosely, which studs are upon the yoked end of a lever, $K^3$, as shown in fig. 1. By means of this lever $K^3$, the rod R can be moved endwise, without disengaging the wheels N $K^1$, and by means of a nut, $k$, applied upon the fulcrum-pin of said lever, as shown in fig. 1; this lever and the shaft can be held so that they will rotate in any desired position longitudinally. Upon this shaft K the seed-distributers J, with their cylindrical cut-offs $J^1$, are secured. There will be as many seed-distributers upon the shaft K as there are discharge-apertures from the hopper, and as all the distributing-devices are constructed exactly alike, I shall describe and illustrate but one.

The seed is received from the hopper into a flaring chamber or throat, $d$, which is formed in a cap, F, as shown in figs. 1, 2, 3, and 6, which throat flares upward, and is of such size and depth as to prevent short straws and sticks from finding a lodgment in it. This cap F is also constructed with a hollow elevation, $d^2$, extending up on one side of its throat $d$, and forming a chamber for receiving a packing, $f$, of India rubber, or other suitable substance, which may be held in place by a wedge block, $e^1$, and expelled by inserting a pin through the hole $e$, shown in figs. 2 and 6. This packing is designed to press upon the surface of the rotary distributer J, and cylindrical cut-off $J^1$, and sweep back the seed so as to prevent it from escaping too rapidly.

At the same time it will form a yielding cushion which will prevent the seed from being crushed or otherwise injured in the act of escaping from the throat $d$. This cap F is also constructed with an enlarged free discharging-passage, $f'$, extending down, in rear of the distributer, into the open space which is below the said distributer, formed in a bearing, G, as shown in figs. 2 and 6. This open space is arranged directly over the seed-tube H, and the seed is guided therein by the trough-shaped extension $f^2$ of bearing G. The front as well as the side wings of the cap and its bearing, are circular, for receiving the distributer, and fitting snugly against it so as to prevent any seed escaping from the throat $d$, except through the passage $f^1$, as described.

On one side of the bearing G, a circular channel is formed by the lip $o'$, through the bottom of which is an opening, $h$, communicating with the opening through the main portion of the bottom of this bearing, shown in figs. 3 and 5. In this channel is a circular flange, S, having segmental projections S', on one side of it, and an opening through it corresponding in shape to the toothed distributer J, so as to allow the teeth thereof to move longitudinally through it when shaft K is adjusted by means of the lever $K^3$. The segments S', on the flange S, are shaped so as to fit into the spaces between the teeth of the distributer, and to abut snugly against the end of the cylindrical cut-off J', when this latter is moved freely beneath the throat $d$ of the cap F, as shown in figs. 3 and 5. This flange S, with its segmental projections S', is just long enough to cover the side wings or ribs of the cap F and bearing G, so that the ends of said segments shall be even with the face of the opening or throat through cap F, thus leaving the openings of the distributer J exactly opposite the opening in cap F, otherwise the distributer would not feed regularly. The opening $h$, below the flange S and its segments S', is designed to allow a free escape of any seed which might get into the recess beneath said flange; and the overhanging lip $o$, on the cap F, is designed to serve, in conjunction with the lip $o'$, to keep the flange S in its place. The annular rib $d'$, on top of the cap F, is designed to fit tightly into the bottom of the hopper, and form a tight joint around the throat $d$.

The cap and bearing above described, being cast separate, are fitted together, as shown in the drawings, and secured across the space between the two parallel beams $A^1 A^2$, by means of screws, or in any other suitable manner.

Within the circular space which is formed by the cap and its bearing is fitted the device for regulating the discharge of the seed from the throat $d$, and for cutting off the discharge completely. This device consists of the toothed portion J and the plane-faced cylindrical portion J'. The toothed portion affords the seed-cells for discharging seed from the throat in greater or less quantities according as more or less of them are exposed beneath this throat, and the cylindrical portion J' serves as a means for closing the said throat. This distributer and cut-off is bored out somewhat larger than the diameter of the shaft K, and when applied upon this shaft it is attached to it by a cross-pin, $t$, shown in fig. 3, which passes loosely through the shaft and tightly through the distributer and cut-off. This will allow the distributer and cut-off to work freely, and without binding in the cap and bearing, and also allow this distributer and cut-off to be fitted snugly in said cap and bearing.

Beneath the openings through the bottom of the bearing G is the tapering seed-tube H, which is secured to the beams $A^1 A^2$, and extended down in front of the axle C a proper distance. This tube H has a cone-scatterer, I, suspended beneath its discharge-end, by the pendants $g$, upon which cone the seed fall, and are spread and scattered over the ground in every direction.

To effect this scattering of the seed more perfectly, I form annular ribs $g'$ upon the surface of said cone, as shown in figs. 2 and 3, which will interrupt the streams of seed, and scatter them uniformly and over a large surface of ground.

Each one of the hoes $D^1$ is of a lozenge-shape, and is secured to a standard, $D^1$, which passes through an oblong slot through the drag-bar D. The standard $D^1$ is pivoted to the drag-bar by a transverse bolt, $a^2$, and constructed of the form substantially as shown in figs. 2 and 7, with its front portion $a^1$ curved in the form of a segment, and provided with a clamp, which serves as a stop to resist all ordinary backward pressure against the hoe. This clamp or stop consists of a forked casting, $b^1$, which partly embraces the portion $a$ on top of the drag-bar D, and which is constructed with an eye-piece, $b$, upon it, through which the screw-threaded end of a hooked bolt, $b^2$, passes. The hook of this bolt embraces the curved portion $a^1$ of the standard $D^1$, and the straight portion receives upon it a nut, by means of which the device can be clamped firmly to the standard. By loosening this nut, the standard can be adjusted about its pivot $a^2$, and set to run at any desired pitch or inclination. Should the hoe strike an obstruction in its path, which might break or derange the machine, the clamp-stop will allow the standard $D^1$ to slip backward, and thereby pass unimpaired over such obstruction.

Having described my invention, what I claim as new, and desire to secure by Letters Patent, is—

1. The construction of the cap F, with an upwardly-flaring throat, $d$, with a hollow projection, $d^2$, for receiving a packing, $f$, and also with a discharge-passage, $f^1$, substantially as described.

2. The construction of the bearing G, with discharge-openings $h$ and $f^2$ through its bottom, and with a recess on one side of it, over opening $h$, for receiving the circular flange S, said bearing being applied to the cap F, and adapted to serve, in conjunction therewith, as a receptacle for the rotary distributer J and cylindrical cut-off J', substantially as described.

3. The flange S, with segmental projections S', in combination with the distributer J and cut-off J', arranged to operate substantially as and for the purpose described.

4. Applying the distributer J and cut-off J' loosely upon its shaft K, in combination with the cap F and bearing G substantially as described and for the purposes set forth.

5. While not claiming conical scatterers, I do claim constructing conical scatterers I, for seed-discharging tubes, with circular ribs or corrugations upon their surfaces, substantially as described.

6. The combination of the driving-wheel N, pinion $K^1$, clutch $n\ n'$, and lever P, with the device $K^2\ K^3$, for regulating the discharge of seed, substantially as described.

7. The construction of the plate E, with the lateral offset $c$, serving as an end-bearing for the rod $D^2$, for carrying drag-bars D, substantially as and for the purposes described.

8. The adjustable clamp stops, pivoted to hoe-standards $D^1$, when such stops are so constructed as to resist ordinary backward pressure against the hoes, and also to allow the standards to slip backward when subjected to an extraordinary pressure, substantially as described.

GEO. ESTERLY.

Witnesses:
    GEO. W. ESTERLY,
    E. P. BURROWS.